United States Patent [19]

Waddill

[11] Patent Number: 4,533,719
[45] Date of Patent: Aug. 6, 1985

[54] EPOXY RESINS WITH INCREASED FLEXIBILITY

[75] Inventor: Harold G. Waddill, Austin, Tex.

[73] Assignee: Texaco, Inc., White Plains, N.Y.

[21] Appl. No.: 592,143

[22] Filed: Mar. 22, 1984

[51] Int. Cl.$^3$ .................. C08G 59/54; C07G 103/50
[52] U.S. Cl. .................. 528/111; 528/111.5; 528/123; 528/407; 260/404.5
[58] Field of Search .......... 528/111, 111.5, 123, 528/407; 260/404.5

[56] References Cited

U.S. PATENT DOCUMENTS

| | | | |
|---|---|---|---|
| 4,128,525 | 12/1978 | Yeakey et al. | 524/602 |
| 4,162,931 | 7/1979 | Yeakey et al. | 156/331.8 |
| 4,167,498 | 9/1979 | Waddill | 523/414 |
| 4,179,418 | 12/1979 | Waddill | 523/407 |
| 4,182,845 | 1/1980 | Yeakey et al. | 528/340 |
| 4,436,891 | 3/1984 | Umeda et al. | 528/407 |

*Primary Examiner*—Veronica P. Hoke
*Assistant Examiner*—Garnette D. Draper
*Attorney, Agent, or Firm*—J. H. Park; Kenneth R. Priem

[57] ABSTRACT

Epoxy resins of increased flexibility and other improved properties are produced by curing a vicinal epoxy resin by combining the resin with a cured amount of a monoamide prepared by the condensation of fatty saturated or unsaturated monocarboxylic acids and polyoxyalkylene polyamines with an amine functionality of about 3 or greater. The cured epoxy resins are useful, for example, as thermal shock resistant encapsulations and adhesives.

13 Claims, No Drawings

EPOXY RESINS WITH INCREASED FLEXIBILITY

BACKGROUND OF THE INVENTION

Field of the Invention

This invention relates to curable epoxy resin formulations. It is known to form epoxy resins by curing a vicinal polyepoxide with curing agents comprising polyamides which are reaction products of polyoxyalkylene polyamines with di- or greater carboxylic acids (see, for example, U.S. Pat. Nos. 4,182,845; 4,179,418; 4,167,498; 4,162,931 and 4,128,525.

It has been discovered that curable agents comprising monoamides prepared by the condensation of fatty saturated or unsaturated monocarboxylic acids and polyoxyalkylene polyamines provide curing agents which are effective in providing a high degree of flexibility to cured epoxy resins.

SUMMARY OF THE INVENTION

The invention is an epoxy resin composition having super flexibility and being the cured reaction product of a curable admixture which comprises a vicinal polyepoxide and a curing amount of a monoamide prepared by the condensation of fatty monocarboxylic acids and polyoxyalkylene polyamines with an amine functionality of 3 or more. The invention is also the monoamide compositions resulting from the condensation of fatty monocarboxylic acids and polyoxyalkylene polyamines with an amine functionality of 3 or more.

DESCRIPTION OF THE PREFERRED EMBODIMENTS

According to the instant inventive concept, curing agents for vicinal polyepoxides are novel monoamides of the following general structures:

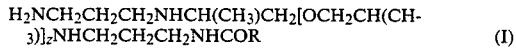

where $R=-(CH_2)_xCH_3$; $x=6-16$; $z=2.6-33$ Or as:

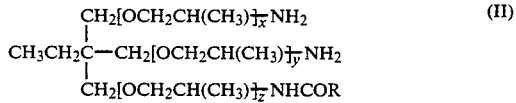

where
$x+y+z=5.3$
$R=(CH_2)_aCH_3$
$a=6-16$

These monoamides can be prepared by the condensation of fatty monocarboxylic acids and polyoxyalkylene polyamines with an amine functionality of 3 or more.

Included within the scope of the fatty monocarboxylic acids useful to prepare the above monoamides are oleic, palmitic, stearic, linoleic, linolenic, myristic, lauric, cupric, caprylic, pelargonic, palm oil, coconut oil, cottonseed oil, tall oil fatty acids and tallow fatty acids.

The acid recitation of monocarboxylic acids is only intended to be exemplary of those useful in the invention. Others will be apparent to those skilled in the art.

The polyoxyalkylene polyamines useful in the present invention are those which are the precursors of the monoamides depicted above.

Generally, the amine cured vicinal polyepoxide containing compositions are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups; e.g., hydroxyl groups, ether radicals, aromatic halogen atoms and the like.

Preferred polyepoxides have epoxy equivalent weights (EEW) of about 185 and are those of glycidyl ethers prepared by epoxidizing the corresponding allyl ethers or reacting, by known procedures, a molar excess of epichlorohydrin and an aromatic polyhydroxy compound; i.e., isopropylidene bisphenol, novolak, resorcinol, etc. The epoxy derivatives of methylene or isopropylidene bisphenols are especially preferred.

A widely used class of polyepoxides which are useful according to the instant invention includes the resinous epoxy polyethers obtained by reacting an epihalohydrin, such as epichlorohydrin, and the like, with either a polyhydric phenol or a polyhydric alcohol. An illustrative, but by no means exhaustive, listing of suitable dihydric phenols incldes 4,4'-isopropylidene bisphenol, 2,4'-didhydroxydiphenylethylmethane, 3,3'-dihydroxydiphenyldiethylmethane, 3,4'-dihydroxydiphenylmethylpropylmethane, 2,3'-dihydroxydiphenylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones; e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers; e.g., polyethylene glycols, polypropylene glycols, triglycerol, dipentaerythritol and the like, polyallyl alcohol, polyhydric thioethers, such as 2,2'-, 3,3'-tetrahydroxydipropylsulfide and the like, mercapto alcohols such a monothioglycerol, dithioglycerol, and the like, polyhydric alcohol partial esters, such as monostearin, pentaerythritol monoacetate, and the like, and halogenated polyhydric alcohols such as the monochlorohydrins of glycerol, sorbitol, pentaerythritol and the like.

Another class of polymeric polyepoxides which can be amine cured and are in accordance with the instant invention includes the epoxy novolak resins obtained by reacting, preferably in the presence of a basic catalyst; e.g., sodium or potassium hydroxide, an epihalohydrin, such as epichlorohydrin, with the resinous condensate of an aldehyde; e.g., formaldehyde, and either a monohydric phenol; e.g., phenol itself, of a polyhydric phenol. Further details concerning the nature and preparation of these epoxy novolak resins can be obtained in Lee, H. and Neville, K., *Handbook of Epoxy Resins,* McGraw-Hill Book Co., New York, 1967.

It will be appreciated by those skilled in the art that the polyepoxide compositions which are useful according to the practice of the present invention are not limited to those containing the above described polyepoxides, but that these polyepoxides are to be considered merely as being representative of the class of polyepoxides as a whole.

Optionally, the epoxy resin formulations of the instant invention can include an "accelerator" to speed the amine cure of the epoxy resin, especially at ambient temperatures. In several applications, such acceleration is beneficial, especially when an epoxy resin is used as an adhesive in flammable environment, thus making elevated temperature cure inconvenient or even hazardous. Lee, H. and Neville, K., *Handbook of Epoxy Resins*, pp. 7-14, describes the use of certain amine containing compounds as epoxy curing agent-accelerators.

Many accelerators are known in the art which can be utilized in accordance with the instant invention. Examples include salts of phenols; salicyclic acids; amine salts of fatty acids such as those disclosed in U.S. Pat. No. 2,681,901, and tertiary amines such as those disclosed in U.S. Pat. No. 2,839,480. A preferred accelerator in accordance with the instant invention is disclosed in U.S. Pat. No. 3,875,072 issued to G. Waddill, Apr. 1, 1975. The accelerator comprises a combination of piperazine and an alkanolamine in a weight ratio of about 1:8 to 1:1.

Additionally, conventional pigments, dyes, fillers, flame retarding agents and the like which are compatible, and natural or synthetic resins can be added. Furthermore, although not preferred, known solvents for polyepoxide materials such as toluene, benzene, xylene, dioxane, ethylene glycol monomethyl ether and the like can be used.

The following examples illustrate the nature of the instant invention but are not intended to be limitative thereof.

EXAMPLE 1

| Typical Preparation of Monoamide of JEFFAMINE ® T-403[1] | | | |
|---|---|---|---|
| | Molecular Weight | Moles | Weight | Charge, g |
| Reactants | | | | |
| JEFFAMINE T-403[1] | 493 | 1.05 | 517 | 517 |
| Tall oil fatty acid[2] | 289.8 | 1.0 | 289.8 | 290 |
| Azeotrope | | | | |
| Toluene, ml | | | | 100 |

$$CH_3-C\begin{matrix}CH_2[OCH_2CH(CH_3)]_x-NH_2\\CH_2[OCH_2CH(CH_3)]_y-NH_2\\CH_2[OCH_2CH(CH_3)]_z-NH_2\end{matrix}$$

[1] wherein x + y + z are finite numbers having a total such that the molecular weight of said polyoxyalkylene polyamine is about 400.
[2] ACINTOL ® EPG (saponification value = 200), a product of Arizona Chemical Co.

Reactants, azeotrope were added to the reaction flask equipped with stirrer, $N_2$ inlet tube, thermometer, Dean-Stark trap, overhead cold water condenser. Reactants were heated to reflux (155°-255° C.) while removing water. Reaction time ~6 hours. After water removal, the product was stripped under vacuum to remove solvent.

Properties of Product

Total acetylatables, meq/g: 3.14
Total amine, meq/g: 3.06
Primary amine, meq/g: 2.60
Brookfield viscosity, cps, 25° C.: 350

EXAMPLE 2

| Properties of Epoxy Resin Cured With JEFFAMINE T-403 Monoamide | | | | |
|---|---|---|---|---|
| | A | B | C | D |
| Formulation | | | | |
| Liquid epoxy resin (EEW ~ 185) | 100 | 100 | 100 | 100 |
| JEFFAMINE T-403 Monooleamide | 90 | — | — | — |
| JEFFAMINE T-403 Mono (tall oil Acid Amide) | — | 90 | — | — |
| JEFFAMINE T-403 Monopalmitamide | — | — | 85 | — |
| JEFFAMINE T-403 | | | | 42 |
| Properties of Cured ⅛th in. Castings:[1] | | | | |
| Izod impact strength, ft/lbs/in | 1.26 | 1.93 | 1.54 | 0.68 |
| Tensile strength, psi | 3600 | 2700 | 5100 | 9500 |
| Tensile modulus, psi | 186000 | 122000 | 241000 | 418000 |
| Elongation at break, % | 61 | 67.5 | 8.6 | 6.7 |
| Flexural strength, psi | 7000 | 4200 | 9600 | 15500 |
| Flexural modulus, psi | 199000 | 141000 | 286000 | 437000 |
| HDT, °C., 264 psi/66 psi | 34.5/38 | 30/33 | 36/38 | 83/87 |
| Shore D hardness, 0–10 sec | 74–70 | 71–64 | 75–71 | 78–75 |

[1] Cured 2 hours at 80° C.; 3 hours at 125° C.

EXAMPLE 3

| Properties of Epoxy Resin Cured With Mixtures of N—Aminoethylpiperazine (AEP) and JEFFAMINE T-403 Monoamides | | | | |
|---|---|---|---|---|
| | A | B | C | D |
| Formulations | | | | |
| Liquid epoxy resin (EEW ~ 185) | 100 | 100 | 100 | 100 |
| N—Aminoethylpiperazine | 24 | 18 | 18 | 18 |
| JEFFAMINE T-403 Oleamide | — | 18 | — | — |
| JEFFAMINE T-403 Tall oil acid amide | — | — | 18 | — |
| JEFFAMINE T-403 Monopalmitamide | — | — | — | 18 |
| Properties of Cured ⅛th in. castings:[1] | | | | |
| Izod impact strength, ft-lbs/in | 0.25 | 0.12 | 0.27 | 0.20 |
| Tensile strength, psi | 9600 | 9400 | 9300 | 9500 |
| Tensile modulus, psi | 329000 | 406000 | 403000 | 397000 |
| Elongation at break, % | 8.4 | 9.4 | 4.8 | 7.4 |
| Flexural strength, psi | 14100 | 16400 | 16100 | 15600 |
| Flexural modulus, psi | 362000 | 415000 | 401000 | 417000 |
| HDT, °C., 264 psi/66 psi | 99/106 | 74/80 | 74/80 | 73/80 |
| Shore D hardness, 0–10 sec | 79–77 | 78–76 | 78–76 | 77–75 |

[1] Cured 2 hours 80°, 3 hours 125° C.

EXAMPLE 4

| Adhesive Properties: Curing with Blends of N—Aminoethylpiperazine and JEFFAMINE T-403 Tall Oil Acid Amide | | | |
|---|---|---|---|
| | A | B | C |
| Formulation | | | |
| Liquid epoxy resin (EEW ~ 185) | 100 | 100 | 100 |
| N—Aminoethylpiperazine | 23 | 14.5 | 11.4 |
| JEFFAMINE T-403 Tall Oil Acid Monoamide | — | 33.5 | 45.6 |
| Adhesive Properties[1] | | | |
| Tensile shear strength, psi | 3000 | 3000 | 3400 |
| T-peel strength, psi | 1.5 | 3.3 | 3.2 |

[1] Cured 2 hours at 110° C.

I claim:

1. An epoxy resin composition having superior flexibility and being the cured reaction product of a curable admixture which comprises a vicinal polyepoxide and a curing amount of a monoamide prepared by the condensation of fatty monocarboxylic acids and polyoxyalkylene polyamides with an amine functionality of 3 or more.

2. An epoxy resin composition as in claim 1 wherein monoamide has the structure:

H$_2$NCH$_2$CH$_2$CH$_2$NHCH(CH$_3$)CH$_2$[OCH$_2$CH(CH$_3$)]$_z$NHCH$_2$CH$_2$CH$_2$NHCOR where R=—(CH$_2$)$_x$CH$_3$; x=6–16; z=2.6–33.

3. A epoxy resin composition as in claim 1 wherein monoamide has the structure:

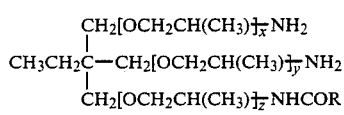

where
x+y+z=5.3
R=(CH$_2$)$_a$CH$_3$
a=6–16.

4. An epoxy resin formulation as in claim 1 wherein the monocarboxylic acid is oleic.

5. An epoxy resin formulation as in claim 1 wherein the monocarboxylic acid is palmitic.

6. An epoxy resin composition having superior flexibility and being the cured reaction product of a curable admixture which comprises a vicinal polyepoxide and a curing amount of a monoamide of the general structure:

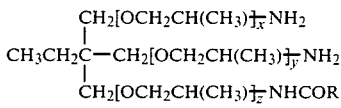

where
x+y+z=5.3
R=(CH$_2$)$_a$CH$_3$
a=6–16.

7. An epoxy resin formulation as in claim 6 wherein the monocarboxylic acid is oleic.

8. An epoxy resin formulation as in claim 6 wherein the monocarboxylic acid is palmitic.

9. An epoxy resin composition having superior flexibility and being the cured reaction product of a curable admixture which comprises a vicinal polyepoxide and a curing amount of a monoamide of the general structure:

H$_2$NCH$_2$CH$_2$CH$_2$NHCH(CH$_3$)CH$_2$[OCH$_2$CH(CH$_3$)]$_z$NHCH$_2$CH$_2$CH$_2$NHCOR where R=—(CH$_2$)$_x$ CH$_3$; x=6–16; z=2.6–33.

10. An epoxy resin formulation as in claim 9 wherein the monocarboxylic acid is oleic.

11. An epoxy resin formulation as in claim 9 wherein the monocarboxylic acid is palmitic.

12. A compound of the formula:

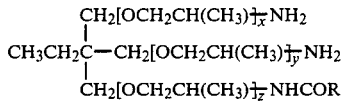

where
x+y+z=5.3
R=(CH$_2$)$_a$CH$_3$
a=6–16.

13. A compound of the formula:

H$_2$NCH$_2$CH$_2$CH$_2$NHCH(CH$_3$)CH$_2$[OCH$_2$CH(CH$_3$)]$_z$NHCH$_2$CH$_2$CH$_2$NHCOR where R=—(CH$_2$)$_x$CH$_3$; x=6–16; z=2.6–33.

* * * * *

UNITED STATES PATENT AND TRADEMARK OFFICE
CERTIFICATE OF CORRECTION

PATENT NO. : 4,533,719
DATED : August 6, 1985
INVENTOR(S) : HAROLD GEORGE WADDILL It is certified that error appears in the above-identified patent and that said Letters Patent is hereby corrected as shown below:

At claim 1, col. 5, line 9, delete the word "polyamides" and replace it with -polyamines.-

Signed and Sealed this

Eighteenth Day of February 1986

[SEAL]

Attest:

DONALD J. QUIGG

Attesting Officer

Commissioner of Patents and Trademarks